United States Patent [19]
Lax et al.

[11] 3,869,618
[45] Mar. 4, 1975

[54] HIGH-POWER TUNABLE FAR-INFRARED AND SUBMILLIMETER SOURCE

[75] Inventors: Benjamin Lax, Chestnut Hill; Roshan L. Aggarwal, Burlington, both of Mass.

[73] Assignee: Massachusetts Institute of Technology, Cambridge, Mass.

[22] Filed: Oct. 30, 1972

[21] Appl. No.: 302,322

[52] U.S. Cl. ............................. 307/88.3, 250/199
[51] Int. Cl. ............................................ H03f 7/04
[58] Field of Search .................... 307/88.3; 250/199

[56] References Cited
UNITED STATES PATENTS
3,731,110  5/1973  Dewey .............................. 307/88.3
3,789,235  1/1974  Bridges et al. .................... 307/88.3

OTHER PUBLICATIONS
Brown et al., "Physical Review Letters", 7 Aug. 1972, pp. 362–364.
Bridges et al., "Physical Review Letters", 7 Aug. 1972, pp. 359–361.
Falk et al., "IEEE Journal of Quantum Electronics", June 1969, pp. 356–357.

Primary Examiner—John Kominski
Assistant Examiner—Darwin R. Hostetter
Attorney, Agent, or Firm—Arthur A. Smith, Jr.; Robert Shaw; Martin M. Santa

[57] ABSTRACT

Apparatus for generating tunable high-power electromagnetic energy in the 50 to 5,000 micron range of the spectrum. In the system disclosed, two high-intensity laser beams of relatively large cross dimensions are mixed to give a difference-frequency output. The two beams are both in the near infrared or the visible region of the spectrum.

17 Claims, 7 Drawing Figures

HIGH-POWER TUNABLE FAR-INFRARED AND SUBMILLIMETER SOURCE

This invention was developed as a result of work done under a contract with the United States Department of the Navy.

The present invention relates to schemes for developing tunable coherent radiation sources in the far-infrared and sub-millimeter regions of the electromagnetic spectrum, extending from approximately 50 microns to 5,000 microns.

The following journal articles have varying degrees of relevance to the present invention:

F. Zernike, Jr. and Paul R. Berman, "Generation of Far Infrared as a Difference Frequency," Physical Review Letters, Volume 15, 27 December 1965, pp. 999–1001; T.Y. Chang, N. Van Tran and C.K.N. Patel, "Absolute Measurement of Second Order Nonlinear Coefficient for Optical Generation of Millimeter Wave Difference Frequencies in GaAs," Applied Physics Letters, Volume 13, 15 November 1968, pp. 357–359; N. Van Tram and C.K.N. Patel, "Free Carrier Magneto-Optical Effects in Far-Infrared Difference-Frequency Generation in Semiconductors," Physical Review Letters, Volume 22, 10 March 1969, pp. 463–466; Tatsuo Yajima and Kuon Inoue, "Submillimeter-Wave Generation by Difference-Frequency Mixing of Ruby Laser Lines in ZnTe," IEEE Journal of Quantum Electronics, Volume QE-5, March 1969, pp. 140–146; D.W. Faries, K.A. Gehring, P.L. Richards, and Y.R. Shen, "Tunable Far-Infrared Radiation Generated from the Difference Frequency between Two Ruby Lasers," Physical Review, Volume 180, 10 April 1969, pp. 363–365; F. Zernike, "Temperature-Dependent Phase Matching for Far-Infrared Difference-Frequency Generation InSb," Physical Review Letters, Volume 22, 5 May 1969, pp. 931–933; R.H. Stolen, "Far-Infrared Absorption in High Resistivity GaAs," Applied Physics Letters, Volume 15, 15 July 1969, pp. 74–75; C.J. Johnson, G.H. Sherman and R. Weil, "Far Infrared Measurement of the Dielectric Properties of GaAs and CdTe at 300 K and 8K," Applied Optics, Volume 8, August 1969, pp. 1667–1671; C.F. Dewey, Jr. and L.O. Hocker, "Infrared Difference-Frequency Generation Using a Tunable Dye Laser," Applied Physics Letters, Volume 18, 15 January 1971, pp. 58–60; B.C. Johnson, H.E. Puthoff, J. SooHoo, and S.S. Sussman, "Power and Linewidth of Tunable Stimulated Far-Infrared Emmission in LiNbO$_3$," Applied Physics Letters, Volume 18, 1 March 1971, pp. 181–183; R.L. Aggarwal, B. Lax, C.E. Chase, C.R. Pidgeon, D. Limbert and F. Brown, "High-Intensity Tunable Insb Spin-Flip Raman Laser," Applied Physics Letters, Volume 18, 1 May 1971, pp. 383–385; D.W. Faries, P.L. Richards, Y.R. Shen and K.H. Yang, "Tunable Far-Infrared Radiation Generated from the Difference Frequency between Two Ruby Lasers," Physical Review A, Volume 3, June 1971, pp. 2148–2150; C.R. Pidgeon, B. Law, R.L. Aggarwal, C.E. Chase and F. Brown, "Tunable Coherent Radiation Source in the 5-$\mu$ Region," Applied Physics Letters, Volume 19, 1 November 1971, pp. 333–335; T.J. Bridges and A.R. Strnad, "Submillimeter Wave Generation by Difference-Frequency Mixing in GaAs," Applied Physics Letters, Volume 20, 15 May 1972, pp. 382–384.

There exists a need in spectroscopy for high power tunable radiation in the range from about ~50 to 5,000 microns since, at present, the only tunable radiation source in this region is a black body which is of quite low power and which is not really readily susceptible to frequency adjustment and control. The development of tunable far-infrared and submillimeter sources providing monochromatic radiation in excess of hundreds of milliwatts peak power, as hereinafter discussed, will have a major impact on the whole field of spectroscopy in this region where conventional blackbody sources provide extremely low powers, in the microwatt range or much less, depending on resolution.

Accordingly, an object of the present invention is to provide a method of and apparatus for generating tunable electromagnetic radiation in the range from about 50 microns to 5,000 microns.

A further object is to provide such radiation at power levels of the order of several hundred milliwatts and up.

A still further object is to provide such radiation in monochromatic form.

Another object is to provide the radiation as a difference frequency formed by mixing two higher frequency laser beams.

A further object is to provide a simple method of achieving phase-matching which is very important for efficient generation of the said difference frequency.

These and still further objects are hereinafter discussed and are particularly delineated in the appended claims.

The foregoing objects are achieved by a method of generating tunable radiation in the far-infrared and submillimeter regions of the electromagnetic spectrum in which the radiation is generated as a difference frequency. To accomplish this purpose, there are produced first and second laser beams of high intensity and large size, both of said beams being in the near-infrared region of the electromagnetic spectrum or both of said beams being in the visible region of the electromagnetic spectrum. The frequency of at least one of the two laser beams is adjusted so that the difference between the frequencies of the two beams is equal to said difference frequency. The two beams are directed upon a non-linear crystal in a non-collinear configuration. The crystal serves to mix the input radiation and thereby to generate the difference-frequency radiation that is then emitted as an output from the crystal. The crystal employed must have a large non-linear coefficient and small absorption coefficient at the frequencies of the two laser beams as well at said difference frequency. Both beams are directed to excite the same portion of the crystal and, due to the large beam size of each (typically 1 cm$^2$ and up in cross dimensions), a substantial volume of the crystal is so excited. The crystal is, of course, at least slightly larger in cross dimensions than the beams and of suitable length (e.g., ~1 centimeter or so) to give volumetric-type mixing. The angle between the first and second non-collinear beams is adjusted to achieve the phase matching necessary for efficient generation of said difference frequency.

The invention will now be explained with reference to the accompanying drawing in which.

As is above discussed the scheme herein described for producing the desired ~50 microns to 500 microns radiation employs optical mixing in a non-linear medium of beams from two near-infrared (or two visible-spectrum) sources of laser radiation, in a manner that produces the desired output radiation as a difference frequency whose magnitude is equal to the difference in the frequencies of the two lasers. Also, the output is tunable. In the discussion that follows, two methods of tuning the frequency or wavelength of said difference-frequency radiation are described: one is by step tuning and the other is by continuous tuning. The necessary phase-matching to effect mixing is achieved by non-collinear volumetric mixing in semiconductors having anomalous dispersion so that the refractive index at the difference-frequency in the far-infrared and submillimeter regions is greater than the refractive index at the frequencies of the two near-infrared (or visible) lasers. Before going into a discussion of the exact apparatus employed to perform the required function, there follows a discussion of the underlying mixing theory.

Figure 5:
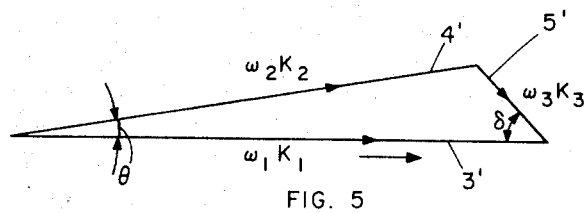
FIG. 5 is an illustration of the principle of non-collinear phase-matching for difference-frequency generation.

The principle of volumetric non-collinear phase-matching herein disclosed for difference-frequency generation is illustrated in FIG. 5. This method of phase-matching has several advantages over other techniques. In particular, it can be used in connection with optically isotropic materials such as the III–V compound semiconductors, InSb, GaAs, CdTe, etc., which possess fairly high non-linear susceptibility, and are fairly transparent in the near-infrared as well as far-infrared and submillimeter regions of the electromagnetic spectrum.

Phase-matched difference-frequency generation requires that the conditions for energy and momentum conservation by satisfied simultaneously. To understand the theory of non-collinear phase-matching, consider two, near-infrared laser beams of frequency $\omega_1$ and $\omega_2$ ($\omega_1 > \omega_2$) being incident on the non-linear crystal such that they propagate at an angle $\theta$ with respect to each other inside the crystalline medium, as shown in FIG. 5. If $\omega_3$ represents the frequency of the difference-frequency radiation, the condition of energy conservation requires:

$$\omega_3 = \omega_1 - \omega_2$$

If $\vec{K_1}$, $\vec{K_2}$ and $\vec{K_3}$ are the respective wave-vectors for radiation of frequencies $\omega_1$, $\omega_2$ and $\omega_3$, the condition of momentum conservation requires that $$\vec{K_3} = \vec{K_1} - \vec{K_2}$$

The above momentum-conservation condition can be rewritten as $$\eta_3 \omega_3 = [(\eta_1 \omega_1 - \eta_2 \omega_2)^2 + 4\eta_1 \eta_2 \omega_1 \omega_2 \sin^2 \theta/2]^{1/2}$$

where $\eta_1$, $\eta_2$ and $\eta_3$ are the refractive indices for radiation of frequencies $\omega_1$, $\omega_2$ and $\omega_3$ respectively. For the sake of simplicity, it is assumed that $\eta_1 \approx \eta_2 = \eta$, and $\eta_3 = \eta + \Delta\eta$. Then the energy and momentum conservation conditions will be satisfied simultaneously when the angle $\theta$ between the two near infrared laser beam is given by $$[1 + (4\omega_1 \omega_2)/(\omega_3^2) \sin^2 \psi/2]^{1/2} = 1 + \Delta\eta/\eta$$

*These relations are obtained from the expression $\eta(\omega) = \eta_\infty \sqrt{(\omega_{2 0}^2 - \omega^2)/(\omega_{t 0}^2 - \omega^2)}$ For $\Delta\eta/\eta \ll 1$, which is the case for many materials, the above equation simplifies to $$\theta \approx \omega_3 \sqrt{2\Delta\eta/\eta \omega_1 \omega_2}.$$

Implicit in the derivation of the above equation is the condition that $\Delta\eta \geq 0$, that is, the refractive index in the far-infrared and sub-millimeter regions is greater than or equal to the refractive index in the near infrared region. On the other hand, if $\Delta\eta < 0$, non-collinear, difference-frequency phase-matching cannot be achieved.

Now the angle $\delta$, as shown in FIG. 5, at which the difference-frequency radiation is generated with respect to the direction of propagation of the incident-radiation of frequency $\omega_1$ is given by $$\cos\delta = 1 + 2(\omega_2/\omega_3) \sin^2\theta/2 \sqrt{1 + (4\omega_1 \omega_2)/\omega_3^2 \sin^2\theta/2}$$

Figure 6:
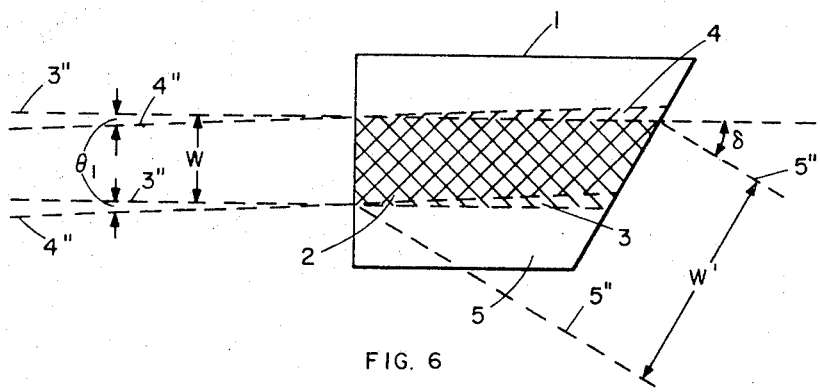
FIG. 6 is a sketch of the GaAs crystal used for phase-matched difference-frequency generation, employing the principle shown in FIG. 5.

For $\Delta\eta/\eta \gg 1$, the above equation yields $$\delta \cong \sqrt{2\Delta\eta/\eta} \approx \sqrt{2(\omega_{20} - \omega)_{t0})/\omega_{t0}}$$

which indicates that the angle $\delta$ does not depend upon the frequency of the far-infrared and sub-millimeter radiation. This is a very important consideration for a practical device. In simple words, the difference-frequency radiation will emerge from the non-linear crystal in the same direction irrespective of the output frequency. In fact, the output face of the non-linear crystal can be so cut that the difference-frequency radiation will emerge normal to the output face. A typical shape of the nonlinear crystal is shown in FIG. 6, wherein the crystal is designated 1 and is shown to be trapezoidal in form.

In FIG. 5 the propagation vectors of the laser beams are designated 3', 4', 5' to represent respectively a first laser input beam, a second laser input beam and the difference-frequency beam—all within the crystal 1. In FIG. 6, as later discussed, the numerals 3, 4 and 5 designate the regions within the crystal respectively occupied by the first, second, and difference-frequency beams and, in this figure, the beams are shown having widths W and W' to illustrate the very important concept of using beams of large size or large cross-section. In FIG. 6 the first and second beams occupy the regions with single cross hatch; the wedge-shaped region designated 2 which contains double cross-hatching is the mixing region in the crystal. This mixing region also has a depth W (see FIG. 1) so that a substantial volume of the crystal 1 is excited by both the first and the second laser beams.

The relationships previously noted herein are applicable for non-linear crystals in a zero magnetic field. If the non-linear crystal 1 is subjected to an applied magnetic field, the relationships are valid provided that the refractive indices $\eta_1$, $\eta_2$ and $\eta_3$ in zero magnetic field are replaced by the corresponding values in a magnetic field, these latter being hereinafter designated $\eta_1'$, $\eta_2'$ and $\eta_3'$, respectively. A particular case of interest is the non-linearity in InSb due to spin resonance processes. (See "Theory of Resonant, Far-Infrared Generation in InSb," T. B. Brown and P. A. Wolff, Physical Review Letters, Volume 29, 7 August 1972, pp. 362–364; and "Resonant Optical Nonlinearity Due to Conduction-Electron Spins in InSb," Van-Tran Nugyen and T. J. Bridges, Physical Review Letters, Volume 29, 7 August 1972, pp. 359–361.) In the presence of free carriers and magnetic field applied in the Voigt configuration the following relationships exist:

$\eta_1' = \eta_1(1-\omega_p^2/\omega_1^2)^{1/2}$ $\eta_2' = \eta_2(1-\omega_p^2/\omega_2^2)^{1/2}$ and $\eta_3' = \eta_3[1-(\omega_p^2(\omega_{T_0}^2\ \omega_3^2)\ (\omega_3^{-2}\omega_p^2))/(\omega_3^2)(-\omega_{L_0}^{-2}\omega_3^2)(\omega_3^{-2}\omega_p^{-2}\omega_c^2)]^{1/2}$, where $\omega_p = (4\pi N e^2)/(m^{-}\epsilon(\delta))$ is the plasma frequency, $\omega_c = (eH/m^{-}c)$ is the cyclotron frequency, $\omega_{L_0}$ and $\omega_{T_0}$ are the longitudinal and transverse optical frequencies. It should be emphasized that $\omega_p$ is less than $\omega_3$ by about a factor of two or more.

Figure 1:
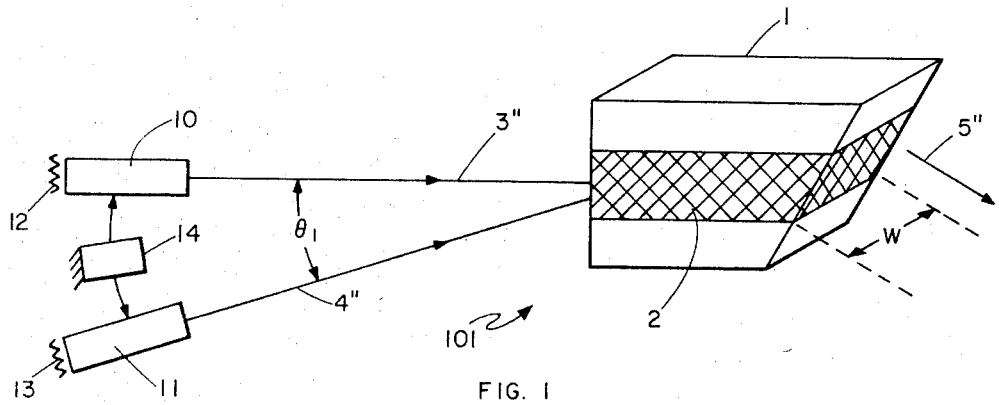
FIG. 1 is a block diagram of a step tunable system embodying the present inventive concept.

Turning now to FIG. 1, there is shown apparatus designated 101 for generating tunable difference frequency of electromagnetic radiation. The apparatus 101 comprises first laser means 10 and second laser means 11 for generating first and second laser beams 3" and 4", respectively, of high intensity and large size. Both of the beams 3" and 4" are either in the near-infrared region or the visible region of the electromagnetic spectrum, as discussed elsewhere herein. Diffraction gratings 12 and 13, as later explained, can be employed to adjust the frequency output of the associated laser so that the difference between the frequencies of the two beams is equal to said difference frequency. The non-linear crystal 1 is positioned to receive the beams 3" and 4" which are directed upon the crystal in a non-collinear configuration, as shown, to generate the difference frequency as an output from the crystal. As is mentioned elsewhere herein, the crystal 1 must have a large non-linear coefficient and small absorption coefficient at the frequencies of the two laser beams 3" and 4" as well as at the difference frequency of the output beam labeled 5".

The beams 3" and 4" must be large size (i.e., at least the order of several square millimeters in cross section) and of high intensity (i.e., the order of kilowatts to megawatts per square centimeter); and, of course, the crystal 1 is greater in cross section than the beams. With 1-cm² input beams, for example, the crystal 1 has cross dimensions greater tha one centimeter. The first beam 3" is directed to the crystal so as to excite the volume or region 3 in FIG. 6, said volume having cross dimensions W—W as before noted. The second beam 4" is directed at an angle $\theta_1$ to the first beam 3" and excites the volume designated 4 in the figure, which also has cross dimensions W—W. The volumes 3 and 4 overlap in the double cross-hatched region 2 to provide a large, wedge-shaped volume within which the non-linear mixing occurs. The difference-frequency radiation 5" emitted from the crystal has cross dimensions W—W'. The element labeled 14 in FIG. 1 serves to adjust the angle $\theta_1$ between the two input beams to achieve the phase matching necessary for efficient generation of the difference frequency. FIG. 6 is two dimensional for simplicity. A three-dimensional crystal is shown schematically in FIG. 1 wherein again the double cross-hatched region 2 represents the large-volume mixing portion of the crystal.

Figure 2:
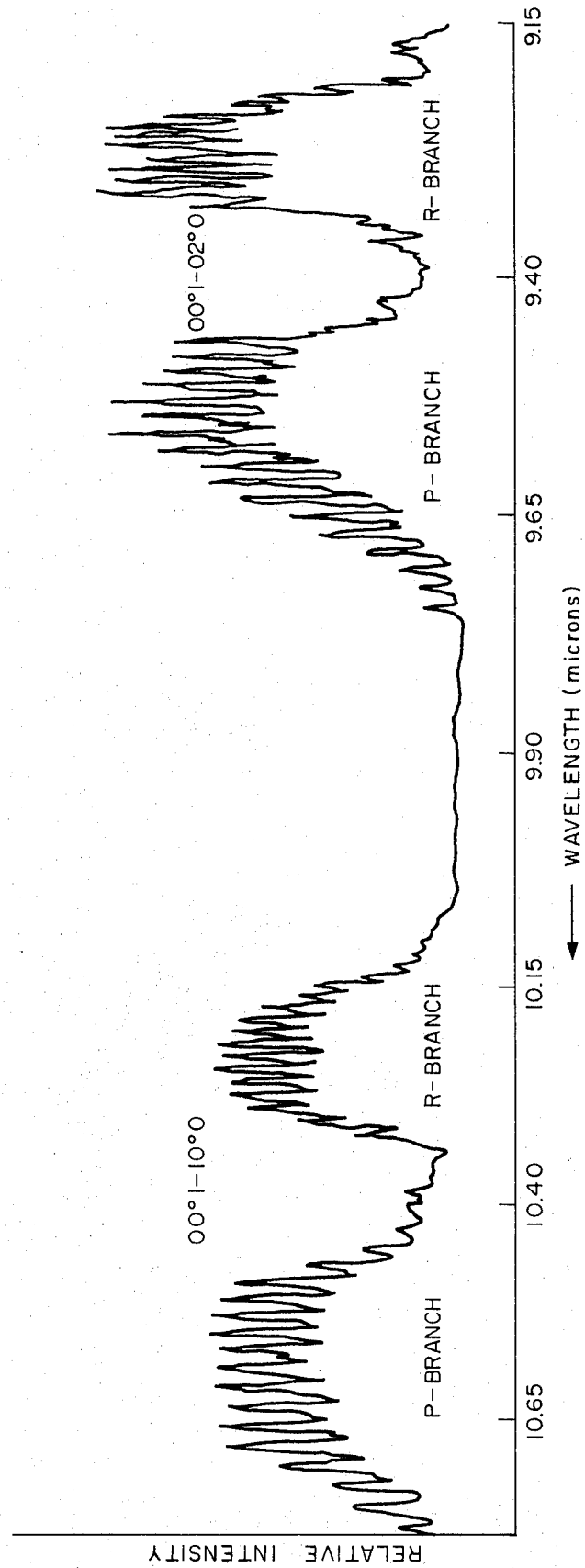
FIG. 2 is a typical spectral output of the transversely excited atmospheric pressure (TEA) CO$_2$ lasers of a type usable in system shown in FIG. 1.

The system 101 can consist of two TEA $CO_2$ lasers; one or both of which can be equipped with a diffraction grating for intracavity dispersion purposes. The diffraction gratings in this circumstance, can give step tunable radiation in the 9 micron to 11 micron range. A typical spectral output of a cavity tuned TEA $CO_2$ laser, as given in FIG. 2, shows that the laser operates at more than 80 different lines; the frequency interval between the neighboring lines varies from about 1 to 2 $cm^{-1}$. This frequency interval corresponds to the tuning step for the difference-frequency radiation. The overall tuning range for the difference-frequency radiation will extend, in principle at least, from a few $cm^{-1}$ to about 180 $cm^{-1}$.

Figure 3:
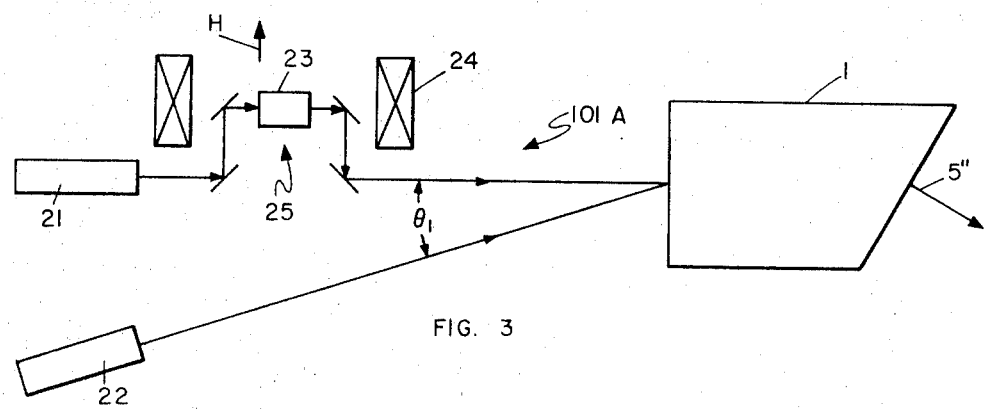
FIG. 3 is a block diagram of a continuously tunable system embodying the present inventive concept and employing a magnetically tunable spin-flip Raman laser.
Figure 4:
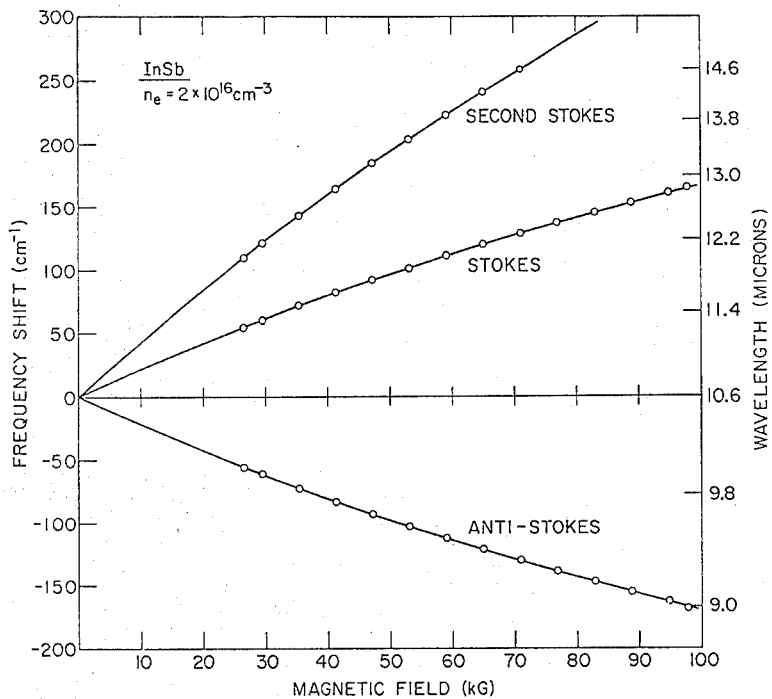
FIG. 4 is a typical spectral output of a magnetically tunable InSb spin-flip Raman laser of a type usable in the system shown in FIG. 3.
Figure 7:
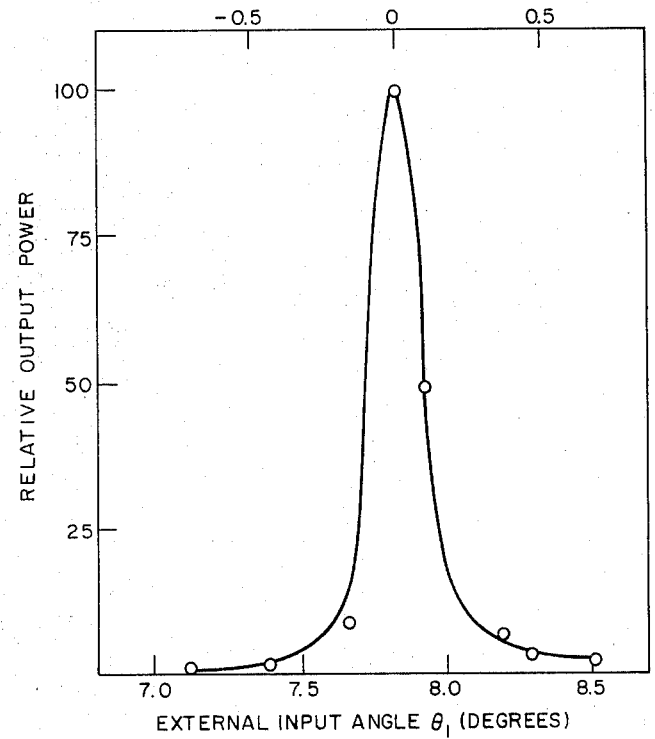
FIG. 7 is a curve of power out v. external input angle in a system employing the principle illustrated in FIG. 5.

FIG. 3 discloses apparatus designated 101A which is somewhat similar to the system 101 in FIG. 1 except that the laser 10 is replaced by a high-intensity spin-flip Raman laser 25 that comprises: a $CO_2$ laser 21, a Bitter or other magnet 24, an InSb crystal 23 and a number of mirrors or other reflectors, not numbered. The laser 25 is turnable between about 9 and 14.5 microns as shown in the tuning curve of FIG. 4. Tuning is accomplished by adjusting the applied magnetic field H of the Bitter magnet up to 100 kilogauss as is discussed more fully in the journal article by Aggarwal et al. in Vol. 18, Applied Physics Letters, 1 May 1971. A $CO_2$ laser 22, like the laser 11 in FIG. 1, is used as the other source of radiation for mixing in the crystal 1.

The phase-matching technique herein described can employ other apparatus than that disclosed. Thus, for example, CO lasers can be employed; the Bitter magnets can be replaced by superconducting magnets or conventional electromagnets; the InSb can be replaced by other low-gap semiconductor materials such as ternary compounds of lead-tin-telluride, lead-tin-selenide, and mercury-cadmiumtelluride as the quality of these crystals becomes comparable to InSb.

Further modifications of the invention herein described will occur to persons skilled in the art and all such modifications are deemed to be within the spirit and scope of the invention as defined by the appended claims.

What is claimed is:

1. A method of generating tunable difference-frequency radiation in the far-infrared and submillimeter regions of the electromagnetic spectrum, that comprises: generating first and second laser beams of high intensity and large size, both of said beams being in the near-infrared region of the electromagnetic spectrum or both of said beams being in the visible region of the electromagnetic spectrum; adjusting the frequency of at least one of the two laser beams so that the difference between the frequencies of the two beams is equal to said difference frequency; directing the two laser beams upon a non-linear crystal in a non-collinear configuration to generate the difference-frequency radiation as an output from the crystal; directing the first beam upon the non-linear crystal so as to excite a substantial volume of the crystal, said crystal having a large non-linear coefficient and small absorption coefficient at the frequencies of the two laser beams as well as at said difference frequency; directing the second beam at an angle to the first beam and to at least a substantial part of the same portion of the crystal excited by the first beam, the beams being mixed in the crystal to provide said difference frequency; and adjusting the angle between the first and second beams to achieve the phase matching necessary for efficient generation of said difference-frequency.

2. Apparatus for generating tunable difference frequency radiation in the far-infrared and submillimeter regions of the electromagnetic spectrum that comprises, in combination: first laser means and second laser means for generating first and second laser beams of high intensity and large size, both of said beams being in the near-infrared region of the electromagnetic spectrum or both of said beams being in the visible region of the electromagnetic spectrum; means for adjusting the frequency of at least one of the two laser beams so that the difference between the frequencies of the two beams is equal to said difference frequency; a non-linear crystal positioned to receive the beams which are directed upon the crystal in a non-collinear configuration to generate the difference frequency radiation as an output from the crystal, said crystal having a large non-linear coefficient and small absorption coefficient at the frequencies of the two laser beams as well as at said difference frequency; the first beam being directed upon the non-linear crystal so as to excite a substantial volume of the crystal, the second beam being directed at an angle to the first beam and to at least a substantial part of the same portion of the crystal excited by the first beam, the beams being mixed in said portion of the crystal to provide said difference frequency; and means for adjusting the angle between the first and second beams to achieve the phase matching necessary for efficient generation of said difference frequency.

3. Apparatus as claimed in claim 2 in which the crystal is greater than several millimeters in cross dimensions and each beam is the order of at least several square millimeters in cross-section, thereby to provide a substantial volume in said portion of the crystal within which mixing occurs.

4. Apparatus as claimed in claim 2 in which the crystal is single-crystal GaAs.

5. Apparatus as claimed in claim 2 in which the crystal is single-crystal CdTe.

6. Apparatus as claimed in claim 2 in which the two laser means generate beams of about equal size and in which the intensity is at least the order of 1 kilowatt per centimeter square.

7. Apparatus as claimed in claim 2 in which the crystal is taken from the group consisting of group III–V compound semiconductors.

8. Apparatus as claimed in claim 2 in which the first laser means and the second laser means are both $CO_2$ lasers and in which at least one of the lasers is provided with a diffraction grating as said means for adjusting the frequency.

9. Apparatus as claimed in claim 2 in which one of the two laser means is a high-intensity spin-flip Raman laser which has an adjustable-frequency output laser beam.

10. Apparatus as claimed in claim 9 in which the high-intensity spin-flip Raman laser comprises a low-gap semiconductor material disposed in the magnetic field of an adjustable-field magnet.

11. Apparatus as claimed in claim 10 in which the low-gap semiconductor material is InSb.

12. Apparatus as claimed in claim 2 in which either or both of said laser means comprise CO lasers.

13. Apparatus as claimed in claim 3 in which the crystal length is the order of one centimeter or so to provide said substantial volume for mixing.

14. Apparatus as claimed in claim 2 in which the crystal has anomalous dispersion so that the refractive index of the crystal at the difference frequency in the far-infrared and submillimeter regions of the spectrum is greater than or equal to the refractive index thereof in the near-infrared and visible regions of the spectrum.

15. Apparatus as claimed in claim 2 in which the output face of the crystal is cut in such a way that the difference-frequency radiation will emerge from the crystal in a direction normal to the output face.

16. Apparatus as claimed in claim 15 in which said angle between the first beam and the second beam is $\theta$ and in which $\theta$ is given by the approximate expression $$\theta \approx \omega_3 \sqrt{2\Delta\eta/\eta\omega_1 \omega_2}$$

where $\omega_1$, $\omega_2$, and $\omega_3$ are the frequencies of the first beam, the second beam and the difference frequency beam, respectively, $\eta \approx \eta_1 \approx \eta_2$ and $\Delta\eta = \eta_3 - \eta$, and where $\eta_1$, $\eta_2$, and $\eta_3$ are the refractive indices for radiation of frequencies $\omega_1$, $\omega_2$, and $\omega_3$, respectively.

17. A method as cliamed in claim 1 in which the environment in and around the non-linear crystal is maintained at or near a zero magnetic field level.

* * * * *